United States Patent [19]

Okabe

[11] 4,429,988
[45] Feb. 7, 1984

[54] PRINTED PAPER FEEDING DEVICE FOR PHOTOGRAPH PROCESSING APPARATUS

[75] Inventor: Katsuhiko Okabe, Tokorozawa, Japan

[73] Assignee: Copal Company Limited, Tokyo, Japan

[21] Appl. No.: 337,245

[22] Filed: Jan. 5, 1982

[30] Foreign Application Priority Data

Jan. 9, 1981 [JP] Japan .................................. 56-2451

[51] Int. Cl.$^3$ ............................................. G03B 29/00
[52] U.S. Cl. ......................................... 355/28; 355/29
[58] Field of Search .................................... 355/28, 29

[56] References Cited

U.S. PATENT DOCUMENTS 4,136,946  1/1979  Nishimoto ............................. 355/28

Primary Examiner—Richard A. Wintercorn
Attorney, Agent, or Firm—Cushman, Darby & Cushman

[57] ABSTRACT

A print paper feeding device for photograph processing apparatus, in order to enable to smoothly and positively feed a continuous tape-shaped print paper from a printer to a processer as fitted to the operating characteristics of the printer and processer, comprising a first feeding roller means to be rotated intermittently, a second feeding roller means which can be intermittently rotated to make a first loop of the print paper of a predetermined size between it and the first feeding roller means and an image developing feeding roller means which can be continuously rotated to make a second loop of the print paper of a predetermined size between it and the second feeding roller means. When the first loop becomes larger than a predetermined size, the first feeding roller means will be stopped and, when the second loop becomes smaller than a predetermined size, the second feeding roller means will be stopped and the tape-shaped print paper will be automatically cut between the second feeding roller means and second loop.

4 Claims, 4 Drawing Figures

PRINTED PAPER FEEDING DEVICE FOR PHOTOGRAPH PROCESSING APPARATUS

BACKGROUND OF THE INVENTION (a) Field of the Invention

This invention relates to a print paper feeding device for photograph processing apparatus wherein a printer and processer are combined with each other to continuously make printing and development in series.

(b) Description of the Prior Art

In such photograph processing apparatus as is mentioned above, generally a long tape-shaped paper is used as a print paper. Such tape-shaped print paper is temporarily stopped in the printing section of the printer to carry out a predetermined printing operation, is then intermittently fed out by one picture frame and is moved toward the processor but the print paper fed into the processor is continuously moved at a predetermined velocity. Thus, in this kind of photograph processing apparatus, the tape-shaped print paper is subjected to run intermittently in the front half of the entire course but to run continuously in the rear half. In order to secure the smooth running of the print paper in spite of such contradiction in the running state, the average running velocity of the paper to be intermittently fed out of the printer is so selected so to be higher than the running velocity within the processor so that the printed paper will be stocked within a stocker provided within the printer and a loop will be formed within the stocker. Further, in this kind of photograph processing apparatus, even if the printing operation is interrupted and the paper is no longer fed out of the printer, the paper fed into the processor will have to be made to run continuously at a predetermined velocity. Therefore, when the amount of the printed paper stocked within the stocker becomes smaller than a predetermined value, that is to say, when the size of the loop within the stocker becomes smaller than a predetermined value, in order to prevent the paper from breaking, it will be necessary to properly cut the paper between the stocker and processer. Further, also in case the amount of the paper fed out of the printer into the processor exceeds a fixed value predetermined in response to the processing capacity of the processor, in order to prevent various troubles from being caused by the loosening of the paper within the processor, it will be necessary to properly cut the paper between the stocker and processer.

Now, such paper must be cut without stopping the operation of the processor. However, in fact, when the paper is cut with a cutter, at least the paper portion to be cut will have to be stopped. Further, the paper must be cut between the picture frames.

In order to meet the above mentioned various requirements, a loop of the paper may be formed between the cutter and processor so that, when the cutter operates, the feeding roller means used to pull the paper out of the stocker will be stopped and the paper will be cut before the above mentioned loop is eliminated. In such case, the feeding roller means will be stopped when a cut mark made in advance on the paper coincides with the position of the blade of the cutter. Further, it is necessary that the above mentioned loop should be always kept to be of a fixed size while the long paper is conveyed. That is to say, if this loop is too small, before the cutting operation of the cutter ends, the paper will begin to move and will be cut in a position displaced from the cut mark and, as a result, an accident of cutting the photograph will be caused. If this loop is too large, the space occupied by the loop will be too large to be desirable.

In order to always keep the size of the loop constant, the feeding velocities of the feeding roller means for pulling out the paper stocked within the above mentioned stocker and the feeding roller means for feeding the paper into the processer may be accurately tuned with each other in the formation. However, such formation is very difficult, because the influence of errors accumulated in the course of feeding the long paper can not be avoided.

SUMMARY OF THE INVENTION

A primary object of the present invention is to provide a print paper feeding device wherein a long print paper is smoothly and properly fed in the entire running course from a printer to a processer and, when such trouble as interferes with such smooth and proper feeding of the paper occurs, the paper will be able to be positively cut between the picture frames.

Another object of the present invention is to provide a print paper feeding device wherein the feed of a long print paper is controlled with reference to cut marks made on the print paper when the paper is printed.

Further another object of the present invention is to provide a loop controlling device wherein the feeding velocity of a feeding roller means for pulling a paper toward a processer out of a stocker is made higher than the feeding velocity of a feeding roller means for feeding the paper into the processer and the feeding operation of the former feeding roller means is made intermittently so that a loop formed between a cutter and the processer will periodically become large and small within a fixed size range.

Further another object of the present invention is to provide a loop controlling device wherein the operation stop of a feeding roller means for pulling a paper toward a processer out of a stocker is controlled by detecting a cut mark made on the paper, the start of the same roller means is controlled by detecting with a senser that a loop has become the smallest so that the loop to be formed may be controlled to be always between the smallest size and the largest size made by adding the length of the paper corresponding to one picture frame to the smallest size.

These and other objects of the present invention will become more apparent during the course of the following detailed description and appended claims.

DESCRIPTION OF THE PREFERRED EMBODIMENT

Figure 1:
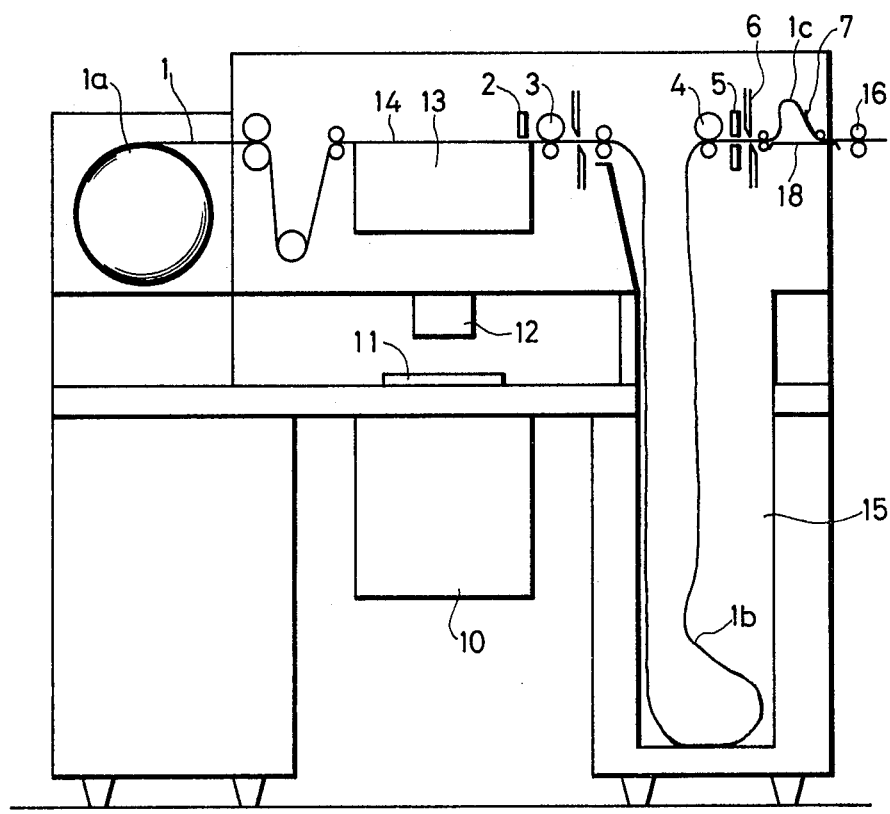
FIG. 1 is a schematic view of a print paper feeding device according to the present invention.
Figure 3:
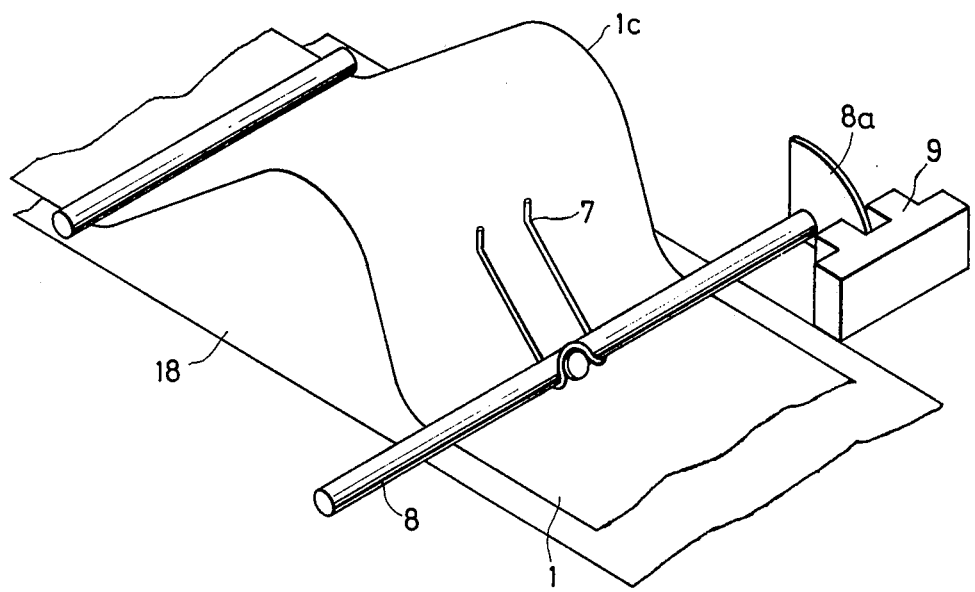
FIG. 3 is an enlarged perspective view showing a concrete formation of a second loop forming part.

In FIGS. 1 and 3, the reference numeral 1 denotes a long tape-shaped print paper to be pulled out of a roll 1a, 2 denotes a cut marker for making a cut mark in a proper place on the paper portion between picture frames printed on the paper 1, 3 denotes a first feeding roller means for feeding the printed paper 1 into a later described stocker, 4 denotes a second feeding roller means for pulling out the paper 1 stocked within the stocker, 5 denotes a cut mark senser for detecting cut marks made on the paper 1, 6 denotes a cutter for cutting the paper 1 when operated by an electric signal accompanying a signal from the cut mark senser 5, 7 denotes a loop detecting lever which is for detecting a loop formed between the stocker and processer and is fitted integrally to a shaft having a shutter blade 8 secured at one end, 9 denotes a photosenser, 10 denotes a lamp box containing a printing light source lamp, 11 denotes a film carrier for passing a negative film for printing on the paper 1, 12 denotes a lens for making a light from the lamp box 10 having passed through the negative film form images on the paper 1, 13 denotes a trimming mask for determining a print size, 14 denotes a print face for printing the paper 1, 15 denotes the above mentioned stocker arranged between the first feeding roller means 3 and second feeding roller means 4 to contain a first loop 1b of the paper 1, 16 denotes a feeding roller means rotated continuously at a fixed velocity to feed the printed paper 1 into a processer (not illustrated) combined with the printer and 18 denotes an underside paper guide.

Figure 2:
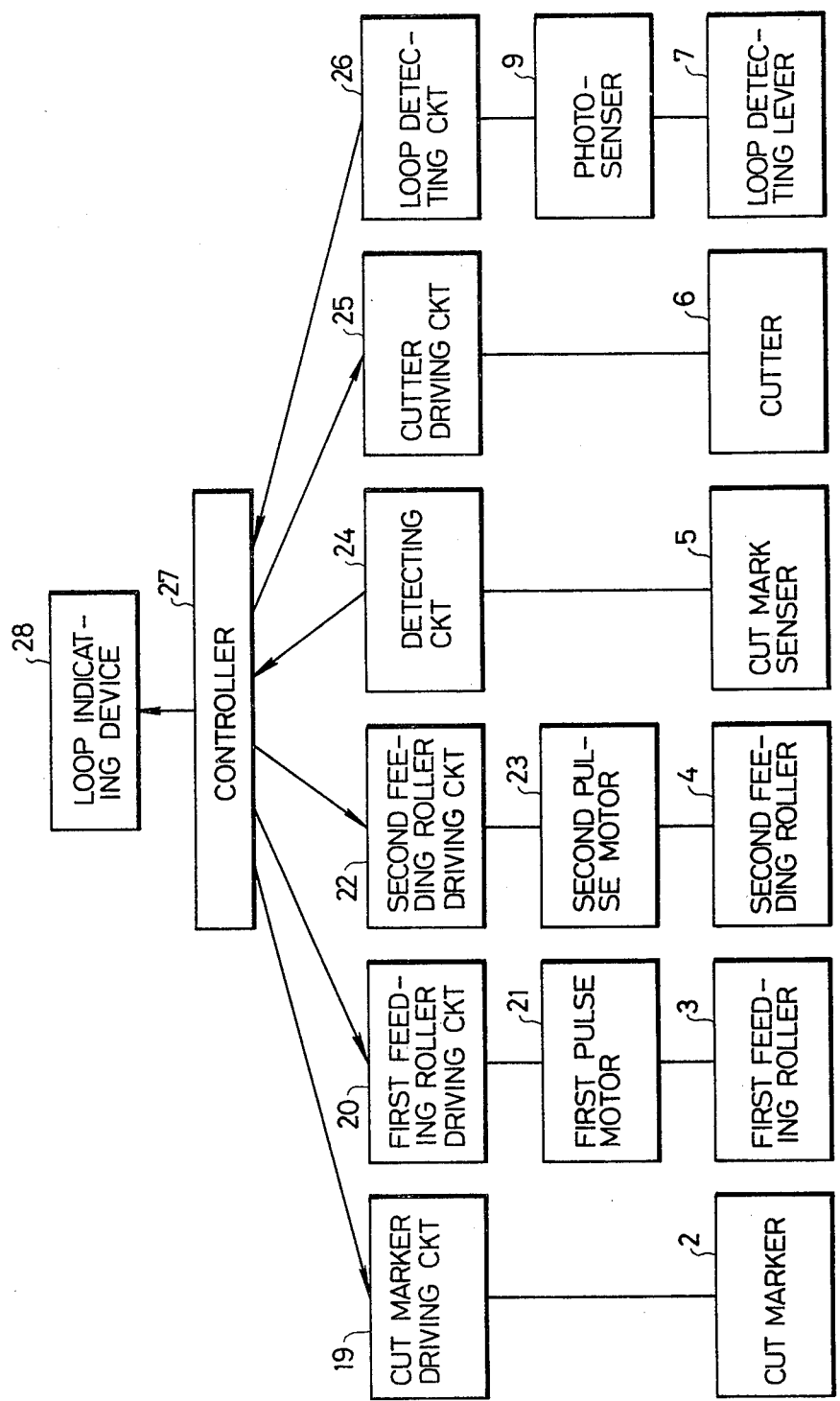
FIG. 2 is a block diagram showing an operation system of the device shown in FIG. 1.

In FIG. 2, the reference numeral 19 denotes a cut marker driving circuit controlling the operation of the cut marker 2, 20 denotes a first feeding roller driving circuit controlling the operation of a first pulse motor 21 for driving the first feeding roller means 3, 22 denotes a second feeding roller driving circuit controlling the operation of a second pulse motor 23 for driving the second feeding roller means 4, 24 denotes a detecting circuit of the cut mark senser 5 for detecting the cut marks made on the paper 1 by the cut marker 2, 25 denotes a cutter driving circuit controlling the operation of the cutter 6, 26 denotes a loop detecting circuit detecting the operation of a loop senser formed of the loop detecting lever 7 detecting the loop formed between the stocker 15 and processer and the photosenser 9, 27 denotes a controller consisting of microprocessers controlling the operations of the above mentioned respective circuits 19, 20, 22 and 25 and receiving signals from the circuits 24 and 26 by programming made in advance and 28 denotes a loop indicating device having the operation controlled by the controller 27 and consisting of an electric circuit part and such digital indicating part as of a fluorescent indication.

Figure 4:
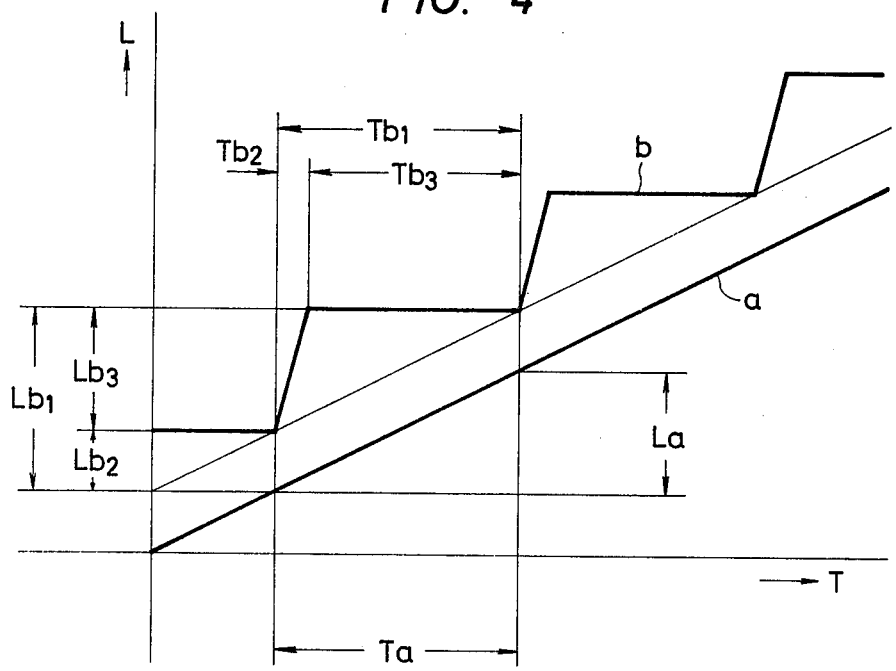
FIG. 4 is an explanatory diagram showing an operation relation between the intermittent feed and continuous feed of a long print paper.

FIG. 4 is a running state explaining diagram of the paper 1 wherein the reference symbol a indicates a running state of the paper 1 fed by the roller means 16, b indicates a running state of the paper 1 fed by the second feeding roller means 4, L indicates a fed length of the paper 1, T indicates an elapsing time, La indicates a length of one picture frame portion of the paper 1, Ta indicates a time required to feed the length La of this one picture frame portion, $Tb_1$ indicates a time while the second feeding roller means 4 starts a feeding operation, stops it and then starts the operation and is equal to the time Ta, $Tb_2$ indicates a time while the roller means 4 is making a feeding operation, $Tb_3$ indicates a time while the roller means 4 stops, $Lb_1$ indicates a length of the paper 1 when the second loop 1c is of the largest size, $Lb_2$ indicates a length of the paper 1 when the second loop 1c is of the smallest size and $Lb_3$ indicates a length of one picture frame portion when the paper 1 is fed by the second feeding roller means 4 and is equal to the length La.

The operation shall be explained in the following.

FIG. 1 shows a state that the paper 1 is pulled out of the paper roll 1a, is printed on the printing face 14, then forms the first loop 1b within the stocker 15 and forms the second loop 1c between the stocker 15 and processer (not illustrated), that is, in the rear of the cutter 6 while it is led into the processer by the feeding roller means 16 on the processer side. In FIGS. 1 to 3, when the controller 27 issues a signal to print and cut-mark the paper 1, thereby the paper 1 will be printed on the printing face 14 and will be marked with a cut mark by the cut marker 2 and, at this time, the first feeding roller means 3 will be stopped. When the cut mark is made on the paper 1, the controller 27 will drive the first feeding roller means 3 to advance the paper 1 by one picture frame, stop it again and repeat the above mentioned operation. The paper 1 fed out by the first roller means 3 will form the later detailed first loop 1b within the stocker 15. On the other hand, the printed and cut-marked paper 1 within the stocker 15 will be fed out toward the feeding roller means 16 by the intermittent rotation of the second feeding roller means 4 and will then be passed through the cut mark senser 5. Whenever the cut mark senser 5 discovers the cut mark when the paper 1 passes through it, it will send a signal to the controller 27 to once stop the second feeding roller means 4 and then start it again. The time while the second feeding roller means 4 is stopped will be such time as is sufficient for the cutter 6 to operate to cut the paper 1. As shown in FIG. 4, the second feeding roller means 4 will rotate for the time $Tb_2$ to feed the paper 1 by the length $Lb_3$, that is, by one picture frame portion, there the cut mark on the paper 1 will be detected by the cut mark senser 5 and the second feeding roller means 4 will be stopped by the instruction of the controller 27 so that the second loop 1c will be formed of the paper 1 portion corresponding to the length $Lb_1$. Even after the second feeding roller means 4 starts and stops, the feeding roller means 16 will rotate continuously at a fixed velocity. Therefore, the second loop 1c formed as mentioned above will become gradually smaller until it is formed of only the paper 1 portion corresponding to the length $Lb_2$. Then, as the second loop 1c becomes smaller, the loop detecting lever 7 rotating counterclockwise in FIG. 3 will operate the photosenser 9 by the blade 8a integral with it through the shaft 8 to send a signal to the controller 27 to again start the rotation of the second feeding roller means 4.

The above mentioned first loop 1b shall be explained in the following. The first loop 1b of the paper 1 within the stocker 15 is formed to stably feed the printed paper 1 to the processer to absorb the difference between the capacity of the printer of printing the paper 1 and the capacity of the processer of processing the paper 1 and continuously process the paper 1 to develop images on it at a fixed velocity. Now the time required for the printing process is so random as not to be constant and is too early or too late for the processing velocity of the processer. In order to solve the problems produced by this irregularity of the printing process time, the first loop 1b is formed in advance within the stocker 15. When the processing velocity of the printer is lower than that of the processer, the first loop 1b will become smaller. In case the first loop 1b becomes smaller than a predetermined constant amount, the cutter 6 will be operated to once cut the paper 1 and the paper will have to be fed anew into the stocker 15. On the contrary, when the processing velocity of the printer is higher than that of the processer and the paper 1 is fed in excess of the containing capacity of the stocker 15, the printer will be stopped to interrupt the printing process and the feed of the paper 1 will have to be stopped. As mentioned above, the first loop 1b becomes large or small depending on the difference between the paper 1 feeding velocities of the first feeding roller means 3 and second feeding roller means 4 produced with respect to the processing capacity of the printer for the processer within the stocker 15. This state is always controlled by the controller 27 on the basis of present programming and is indicated by the loop indicating device 28 in values based on the number of the cut marks.

The detection of the first loop 1b shall be explained in the following. The first loop 1b is detected as the number of the picture frames instead of the length of the paper 1 forming the loop. The number of the picture frames is counted on the basis of the number of the cut marks. That is to say, the paper 1 portion fed into the stocker 15 through the first feeding roller means 3 and forming the first loop 1b is marked with cut marks by the cut marker 2 simultaneously with the printing. These cut marks are made by signals from the controller 27. On the other hand, whenever the cut mark made on the paper 1 portion pulled by the second roller means 4 out of the stocker 15 passes through the cut mark senser 5, a signal will be sent to the controller 27. The controller 27 compares the counted numbers of the cut marks on the paper portion fed into the stocker 15 and the paper portion pulled out of the stocker 15 with each other and always keeps the number of the cut marks included in the first loop 1b by the difference. Therefore, if this number is given to the loop indicating device 28 to be indicated, the size of the first loop 1b will be indicated by the number of the picture frames and, if the size is indicated by a value obtained by multiplying the dimension between the respective cut marks by the number of the cut marks, the length of the first loop 1b will be indicated by the dimension.

In case the counted number of the cut marks of the paper 1 forming the first loop 1b detected and indicated as in the above becomes larger than an upper limit value determined to correspond to the loop containing capacity of the stocker 15, the controller 27 will stop the printing and the operation of the first feeding roller means 3. When the first loop 1b becomes smaller than this upper limit value, the operation will be resumed. Further, if the counted number of the cut marks becomes smaller than a lower limit value predetermined so that the second feeding roller means 4 may not pull the paper 1 from the first feeding roller means 3, the controller 27 will stop the operation of the second feeding roller means 4 and will operate the cutter 6 to cut the paper 1.

By the way, it is needless to say that the present invention is not to be limited to the above described embodiment and that the formation related to the loop senser may be another formation such as, for example, of detecting the loop of the paper 1 directly with the senser.

I claim:

1. A print paper feeding device for photograph processing apparatus comprising a cut marker which can make a cut mark between two adjacent picture frames of a tape-shaped print paper simultaneously with printing it, a first roller means which can intermittently feed said print paper by a length corresponding to one picture frame, a stocker which is set in the rear of said first feeding roller and can contain said print paper portion fed out of said first feeding roller means, a second feeding roller means which is arranged in the rear of said stocker and is to pull said print paper within said stocker out of said stocker, a cut mark senser which is set in the rear of said second feeding roller means and can detect said cut mark and issue a signal to stop said second feeding roller means whenever a length portion corresponding to one picture frame of said print paper is fed, a cutter which is set in the rear of said cut mark senser and can cut the print paper in the position of said cut mark, a third feeding roller means which is arranged in the rear of said cutter and is rotated at a velocity lower than of said second feeding roller means to form a loop of said print paper between it and said cutter, a loop senser which is arranged between said cutter and third feeding roller means and can issue a signal to start said second feeding roller means when said loop becomes smaller than a predetermined size, and a controller which can receive signals from said cut mark senser and loop senser to control the respective operations of said cut marker, first feeding roller means, second feeding roller means and cutter; the size of said loop being maintained between a predetermined lower limit and an upper limit obtained by adding a length corresponding to one picture frame portion to said lower limit by said loop senser; and said print paper being cut in the position of said cut mark by said cutter when the number of said cut marks of the print paper portion which has been fed into a processor by said third feeding roller means attains a predetermined value and said second feeding roller means is stopped.

2. A print paper feeding device according to claim 1 wherein said second feeding roller means is intermittently rotated and said third feeding roller means is continuously rotated.

3. A print paper feeding device according to claim 1 wherein said loop senser comprises a loop detecting lever engaged resiliently with the surface of said print paper forming said loop, a shutter blade fitted to said lever coaxially with said lever, and a photosenser arranged adjacently to said shutter blade and cooperating with said shutter blade to issue signals.

4. A print paper feeding device according to claim 1 wherein the size of a loop to be formed by the print paper portion within said stocker is controlled on the basis of the number of said cut marks of the print paper portion which has been fed into said stocker and the number of said cut marks of the print paper portion which has been pulled out of said stocker.

* * * * *